United States Patent
Suryadevara et al.

(10) Patent No.: US 12,202,973 B1
(45) Date of Patent: Jan. 21, 2025

(54) CLASS A FIRE-RETARDANT POLYISOCYANURATE FOAM BOARDS AND PROCESS FOR MAKING

(71) Applicant: DUPONT SPECIALTY ELECTRONIC MATERIALS US, LLC, Wilmington, DE (US)

(72) Inventors: Kali Ananth Suryadevara, Midland, MI (US); Steve Black, Midland, MI (US); Dan Youmans, Midland, MI (US); Kyoung Moo Koh, Midland, MI (US); Mark Rickard, Midland, MI (US)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 0 days.

(21) Appl. No.: 18/308,212

(22) Filed: Apr. 27, 2023

(51) Int. Cl.
| | |
|---|---|
| *C08L 75/06* | (2006.01) |
| *C08G 18/08* | (2006.01) |
| *C08G 18/42* | (2006.01) |
| *C08G 101/00* | (2006.01) |
| *C08K 5/521* | (2006.01) |
| *C08K 7/14* | (2006.01) |

(52) U.S. Cl.
CPC ............. *C08L 75/06* (2013.01); *C08G 18/14* (2013.01); *C08G 18/4244* (2013.01); *C08K 5/521* (2013.01); *C08K 7/14* (2013.01); *C08G 2101/00* (2013.01); *C08G 2110/0025* (2021.01); *C08G 2110/0066* (2021.01); *C08L 2201/02* (2013.01); *C08L 2203/14* (2013.01)

(58) Field of Classification Search
CPC .. C08L 75/06; C08L 2201/02; C08L 2203/14; C08G 18/14; C08G 18/4244; C08G 2101/00; C08G 2110/0025; C08G 2110/0066; C08K 5/521; C08K 7/14
See application file for complete search history.

(56) References Cited

U.S. PATENT DOCUMENTS

| | | | |
|---|---|---|---|
| 4,028,158 A | 6/1977 | Hipchen et al. | |
| 6,319,962 B1 * | 11/2001 | Singh | C08J 9/141 |
| | | | 521/169 |
| 9,523,195 B2 | 12/2016 | Nandi et al. | |
| 9,528,269 B2 | 12/2016 | Nandi et al. | |
| 9,739,063 B2 | 8/2017 | Nandi et al. | |
| 9,815,256 B2 | 11/2017 | Nandi et al. | |
| 11,267,945 B2 | 3/2022 | Suryadevara et al. | |

OTHER PUBLICATIONS

Nabulsi et al., "Isocyanurate formation during rigid polyurethan foam assembly: a mechanistic study based on in situ IR and NMR spectroscopy", Polym. Chem., vol. 9, pp. 4891-4899, 2018.

* cited by examiner

*Primary Examiner* — Rabon A Sergent

(57) ABSTRACT

A faced polyisocyanurate foam board comprising a halogen-free foam made from a halogen-free foam formulation comprising isocyanate, polyol, and phosphorus-containing flame retardant, and 1.06 to 1.66 kg/m3 (30 to 47 g/ft$^3$) of glass fiber distributed in the foam throughout the thickness of the board; wherein the polyisocyanurate foam board has a trimer content of 11 to 19.5 weight percent, at least 0.1 weight percent phosphorous, and as measured by ASTM E84, a Flame Spread Index of 0 to 25 and a maximum Smoke Development Index of 450 or less.

17 Claims, 2 Drawing Sheets

CLASS A FIRE-RETARDANT POLYISOCYANURATE FOAM BOARDS AND PROCESS FOR MAKING

BACKGROUND OF THE INVENTION

Field of the Invention

This invention relates to fire-retardant polyisocyanurate (ISO) foam boards suitable for use in commercial and residential construction, including applications as insulation in roofing and wall assemblies.

Description of Related Art

Some building applications require roofing and wall assemblies with high levels of fire retardancy. While some less stringent applications can require ASTM E84/UL723 Class B performance, some commercial wall assemblies can require the more stringent E84/UL723 Class A. Class A requires a Flame Spread Index of 0-25 with a Maximum Smoke Development Rating of 450, while Class B only requires a Flame Spread Index of 26-75 with a Maximum Smoke Development Rating of 450.

U.S. Pat. Nos. 9,739,063; 9,528,269; 9,523,195; and 9,815,256; all to Nandi, et. al., provide ISO formulations that are said to "pass" ASTM E84, however, the foams shown in these patents have a E-84 Flame Spread Index ranging from 30 to 35, meaning these foams conform to an E84 Class B rating and do not conform to E84 Class A. Halogenated compounds can be added to foam formulations to improve the Flame Spread Index; for example, U.S. Pat. No. 11,267,945 to Suryadevara, et. al., describes a fire-resistant ISO composition that uses a combination of aliphatic and aromatic brominated compounds that can comply with E84 Class A.

The use of halogenated chemicals is concerning to some; they may have potential toxicity in some applications, and some have a concern over brominated materials in particular. However, there are no solutions known in the art for achieving E84 Class A fire performance in a faced ISO foam product without the use of halogenated compounds. Therefore, what is needed is a faced polyisocyanurate (ISO) foam board that achieves a Class A fire rating as determined by ASTM E84/UL723 without the use of halogenated compounds in the foam formulation.

BRIEF SUMMARY OF THE INVENTION

This invention relates to a polyisocyanurate foam board having a length, width, and thickness, and having a facesheet on both major outer surfaces, the foam board comprising:
a) a halogen-free foam made from a halogen-free foam formulation comprising isocyanate, polyol, and phosphorus-containing flame retardant; and
b) 1.06 to 1.66 kg/m3 (30 to 47 g/ft$^3$) of glass fiber distributed in the foam throughout the thickness of the board;

wherein the polyisocyanurate foam board has a trimer content of 11 to 19.5 weight percent, at least 0.1 weight percent phosphorous, and as measured by ASTM E84, a Flame Spread Index of 0 to 25 and a maximum Smoke Development Index of 450 or less.

This invention also relates to a process for making a polyisocyanurate foam board comprising the steps of:
a) making a flowable halogen-free foam formulation comprising isocyanate and polyol, and phosphorus-containing flame retardant, wherein the NCO Index is 225 to 480, and wherein the phosphorus-containing flame retardant is present in an amount such that the halogen-free foam formulation has at least 0.11 weight percent phosphorus;
b) contacting the flowable halogen-free foam formulation with 1.06 to 1.66 kg/m$^3$ (30 to 47 g/ft$^3$) of an expandable web of glass fiber;
c) pressing the flowable foam formulation into the web of glass fiber to form a board precursor,
d) allowing the flowable foam formulation in the board precursor to expand into a foam in the presence of the web of glass fibers, wherein foam formulation separates and distributes the glass fibers in the web throughout the foam, and further cure to form the polyisocyanurate foam board, wherein the polyisocyanurate foam board has, as measured by ASTM E84, a Flame Spread Index of 0 to 25 and a maximum Smoke Development Index of 450 or less.

DETAILED DESCRIPTION OF THE INVENTION

Figure 1:
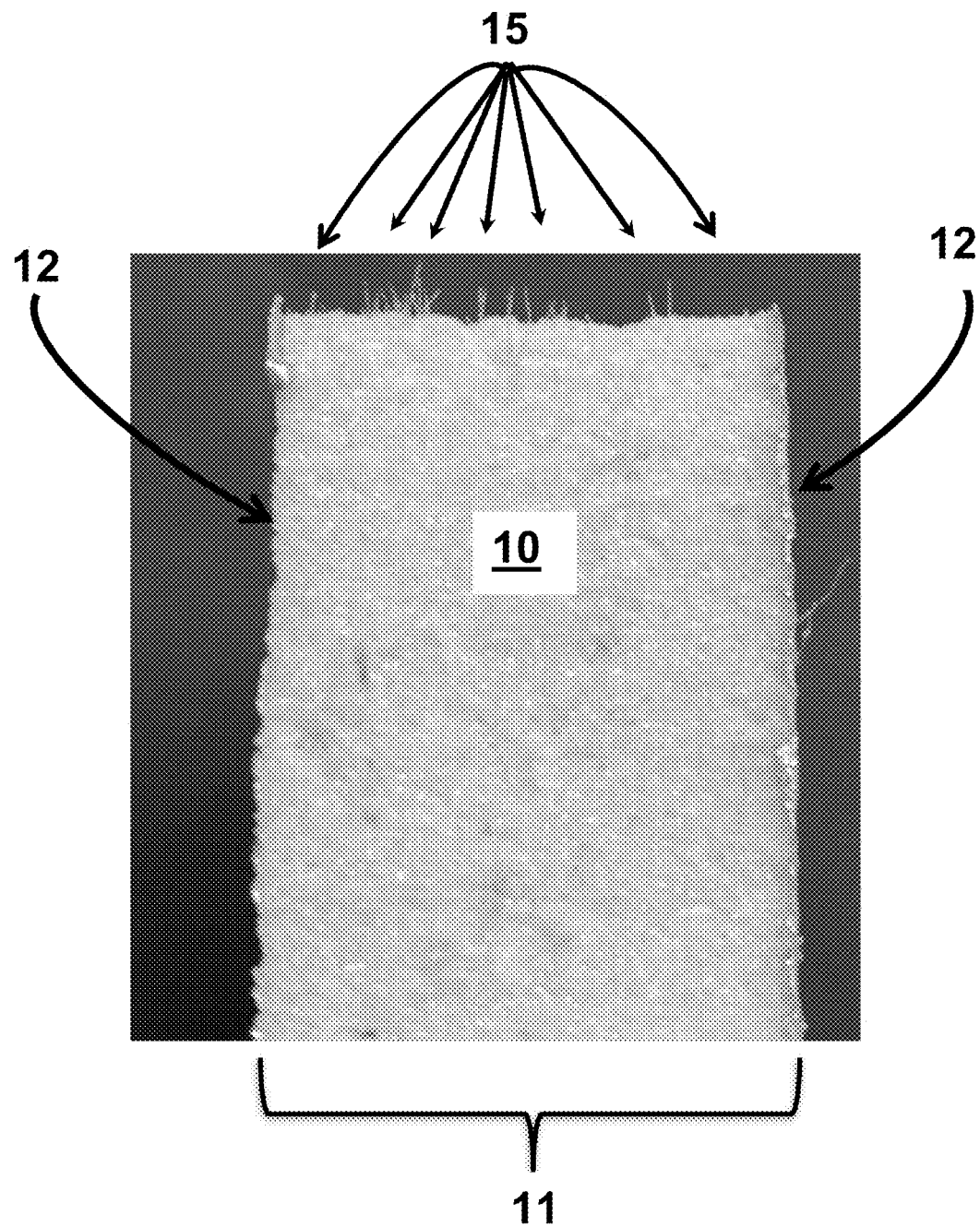
FIG. 1 is a photo of a magnified cross section of a faced polyisocyanurate foam board that has been cut, showing whiskers of glass fibers extending from the cut edge and illustrating fibers from the expanded glass fiber web are distributed throughout the thickness of the board.

This invention relates to a halogen-free polyisocyanurate rigid foam formulation and the resulting board-stock that meets ASTM E84/UL723 with a Class A designation, specifically meeting the difficult "faced" configuration. It is made from a halogen-free foam formulation, the formulation comprising isocyanate, polyol, and phosphorus-containing flame retardant; and an expandable glass fiber web. The final halogen-free polyisocyanurate rigid foam has a length, width, and thickness with glass fiber distributed throughout the thickness of the expanded foam board.

It has been found that the halogen-free polyisocyanurate rigid foam board has superior fire resistance when the foam is made from a foam formulation wherein the ratio of isocyanate groups to hydroxyl (or amine) groups in foam formulation is controlled within a range having an overabundance of isocyanate groups, and this formulation is combined with a particular amount of glass fiber.

Generally, polyurethanes foams are produced by reacting an isocyanate containing two or more isocyanate groups per molecule (R—(N=C=O)$_n$), i.e., a polyisocyanate, with a polyol containing on average two or more hydroxyl groups per molecule (R'—(OH)$_n$); the polymerization reaction makes a polymer containing the urethane linkage, —RNHCOOR'—. At room temperature, the reaction between the polyisocyanate and the polyol starts almost instantaneously, and so the two components are not stored together prior to the desired foaming process. Typically, they are stored as an A-side component containing polyisocyanate, and a B-side component containing the polyol.

Polyisocyanurate foams are produced from similar starting materials and formulation ingredients as those used to produce polyurethane foams except the proportion of isocyanate used is higher. The resulting chemical structure of the polyisocyanurate is significantly different, with the isocyanate groups trimerizing to form the 6-membered (alternating —C—N—) isocyanurate ring structure having N-pendant polyol groups, which link to further isocyanurate groups.

The hydroxyl (OH) number is a measure of the amount of reactive hydroxyl groups available for reaction. The OH number is determined by ASTM D 4274-88. All equivalent weights of polyols disclosed herein are obtained from the formula using OH number:

$$\text{Equivalent Weight of polyol}(\text{in g/equiv.}) = \frac{56.1 \times 1000}{\text{OH number}}$$

The % NCO is a measure of the amount of reactive isocyanate group content for reaction. The % NCO is determined by ASTM D 2575-97. For example, equivalent weights of polymeric MDI, p(MDI), disclosed herein are obtained from the formula using % NCO:

$$\text{Equivalent Weight of } p(MDI)(\text{in g/equiv.}) = \frac{4202}{\% \text{ NCO}}$$

As used herein, and as used in the art, the isocyanate (NCO) Index of a polyisocyanurate foam formulation is the amount of isocyanate groups (actual) in the formulation divided by the amount of isocyanate groups (theoretical) required to react with the available polyol-OH groups in the formulation. The ratio is multiplied by 100 such that an NCO Index of 100 corresponds to a stoichiometric equivalent amount of —NCO and —OH (and an NCO Index of greater than 100 would equate to an excess of isocyanate).

The polyisocyanurate foam board is made from a flowable halogen-free foam formulation comprising isocyanate and polyol, and phosphorus-containing flame retardant; wherein the NCO Index is 225 to 480, and wherein the phosphorus-containing flame retardant is present in an amount such that the halogen-free foam formulation has at least 0.11 weight percent phosphorus. The flowable halogen-free foam formulation is then combined with and pressed into 1.06 to 1.66 kg/m³ (30 to 47 g/ft³) of an expandable web of glass fiber to form a linear board precursor. As used herein, "flowable" formulation means a liquid formulation that can be poured and spread and can penetrate the interstices between glass fibers in a glass web.

Thin layers of facer material or facesheets that become the outer surface of the final foam board are added prior to or during the combination of the formulation and the glass web. The foam formulation in the linear board precursor is then allowed to expand into a foam in the presence of the web of glass fibers, wherein the expanding foam formulation separates and distributes the glass fibers in the web throughout the foam as the precursor board solidifies into a polyisocyanurate foam board. The result is a cured thermoset polyisocyanurate foam board having glass fiber distributed throughout the thickness of the board between the two facesheets. As used herein "thermoset polyisocyanurate foam" is a foam that is unable to reversibly go from a solid to flowable state upon change in temperature without degradation of the foam's polymer network.

The cured polyisocyanurate foam board has a length, width, and thickness, and has a facesheet on both major outer surfaces. By "major surface" it is meant the surface having the two largest dimensions of the board, like the surface described by the length and the width. The polyisocyanurate foam board comprises a halogen-free foam made from a halogen-free foam formulation comprising isocyanate, polyol, and phosphorus-containing flame retardant.

FIG. 1 is a photo of a magnified cross section of a polyisocyanurate foam board 10, containing the expanded foam/glass fiber 11 and two aluminum facers 12, that has been cut to show the presence of glass fiber. The cut edge reveals whiskers of glass fiber 15 sticking out from the cut edge, illustrating the fibers are distributed throughout the thickness of the board from the now-expanded glass fiber web, that was expanded during the expansion of the foam formulation.

The cured, non-halogen, polyisocyanurate foam board has the 1.06 to 1.66 kg/m³ (30 to 47 g/ft³) of glass fibers distributed throughout the thickness of the board. Use of the specific NCO Index range in the non-halogen foam formulation means the cured polyisocyanurate foam board has a trimer content of 11 to 19.5 weight percent. The use of a minimum phosphorous content in the non-halogen foam formulation means the cured polyisocyanurate foam board has at least 0.1 weight percent phosphorous. More importantly, the faced polyisocyanurate foam board has, as measured by ASTM E84, a Flame Spread Index of 0 to 25 and a maximum Smoke Development Index of 450 or less. Underwriters Laboratories Standard UL723 uses the ASTM E84 methodology, therefore ASTM E84/UL723 and ASTM E84 both mean the same performance. These tunnel fire tests can be conducted on foam in core, faced, & slit configurations; the specific performance claimed is with the faced configuration.

The cured, non-halogen, polyisocyanurate foam board is able to form a sufficiently stable char when exposed to flame conditions in accordance with ASTM E-84, and this the stable char enables the polyisocyanurate core to pass this stringent test.

Suitable polyisocyanates for the synthesis of polyisocyanurates include non-halogenated versions of aliphatic, cycloaliphatic, arylaliphatic and aromatic polyisocyanates. The polyisocyanates may be polymeric, monomeric or a blend of monomeric and polymeric isocyanates. Examples of suitable polyisocyanates include alkylene diisocyanates having from 4 to 12 carbon atoms in the alkylene moiety (such as, for example, 1,12-dodecane diisocyanate; 2-methylpentamethylene 1,5-diisocyanate; tetramethylene 1,4-diisocyanate; and hexamethylene 1,6-diisocyanate (HDI)), cycloaliphatic diisocyanates (such as, for example, cyclohexane 1,3- and 1,4-diisocyanate (CHDI); 5-isocyanato-1-(isocyanatomethyl)-1,3,3-trimethyl-cyclohexane (also known as isophorone diisocyanate, or IPDI); 2,4- and 2,6-hexahydrotoluene diisocyanate and the corresponding isomer mixtures; 4,4'-, 2,2'- and 2,4'-dicyclohexylmethane diisocyanate (H12MDI) and the corresponding isomer mixtures) as well as aromatic diisocyanates and polyisocyanates (such as, for example, 2,4- and 2,6-toluene diisocyanate and the corresponding isomer mixtures thereof; 4,4'-, 2,4'- and 2,2'-diphenylmethane diisocyanates and the corresponding isomer mixtures thereof; and polymethylene polyphenyl isocyanates (polymeric MDI or p (MDI) herein)). In some embodiments of the invention, the polyisocyanurate foam is formed from one or more polyisocyanates which may comprise or consist of polymeric polyisocyanate compounds, such as p (MDI). In some embodiments, the composition can comprise p (MDI) having an equivalent weight in the range of from 100 to 10000, desirably from 100 to 5000, or from 100 to 2500. In some embodiments of the invention, the polyisocyanurate polymer is formed from one or more aliphatic or cycloaliphatic polyisocyanate compounds. In some embodiments, the one or more aliphatic or cycloaliphatic polyisocyanate comprises isophorone diisocyanate. In some embodiments, the one or more aliphatic or cycloaliphatic polyisocyanate is isophorone diisocyanate. Commercially available polyisocyanates include, but are not limited to, Lupranate® M20S (BASF Corp., Ludwigshafen, Germany), Mondur® MR (Covestro, Leverkusen, Germany), and PAPI™27 and PAPI™20 (Dow Chemical Co., Midland, MI, USA).

The polyol component is generally one or more than one polymeric polyol and is characterized by having an average hydroxyl functionality of 2.0 or more, and typically in a range of 2.0 to 7.0. The average hydroxyl functionality for a polymeric polyol component can be measured according to ASTM D4274-11 (method D). The hydroxyl functionality of the polyols in the polymeric polyol component can be any value but should be selected such that the average hydroxyl functionality of the entire polymeric polyol component is in a desired range, for example, but not limited to, from 2.0 to 7.0.

Suitable polymeric polyol components for polyisocyanurate synthesis include non-halogenated versions of polyether polyols, polyester polyols, and polycarbonate polyols, as well as polycaprolactone polyols, polyacrylate polyols, polybutadiene polyols, and polysulfide polyols. These can be used individually or in any desired mixtures with one another. Polyisocyanurate foams generally use polyester polyols.

Polyether polyols include those obtainable using conventional synthesis means by reacting epoxides (alkylene oxides such as those selected from a group consisting of ethylene oxide, propylene oxide and butylene oxide, or combinations thereof) with an initiator having two active hydrogen atoms (for a diol) or with an initiator having three active hydrogen atoms (for a triol) or initiators having more than three active hydrogen atoms (for polyols with more than three hydroxyl functional groups). Examples of suitable initiators include ethylene glycol, diethylene glycol, propylene glycol, dipropylene glycol, tripropylene glycol, 1,4-butanediol, 1,6-hexane diol; cycloaliphatic diols such as 1,4-cylcohexane diol, glycerol, trimethylol propane, ethylenediamine, triethanolamine, sucrose and aromatic based initiators or mixtures thereof. Desirable polyols are those obtainable using ethylene oxide or propylene oxide, or a combination of ethylene oxide and propylene oxide (i.e. poly(ethylene oxide-propylene oxide)). Another commonly used polyether polyol is polytetramethylene glycol polyol. Polyether polyols are commercially available, for example, but are not limited to, VORANOL™ 470x, VORANOL™ 360, VORANOL™ 370, or VORANOL™ RN482 (The Dow Chemical Co., Midland, MI, USA); or JEFFOL® SG-360 or JEFFOL® SG-522 (Huntsman Corp., The Woodlands, TX, USA); or Carpol® SP-477, Carpol® GSP-280 or Carpol® GSP-355 (Carpenter Co., Richmond, VA, USA).

Polyester polyols include those obtainable from conventional synthesis using polycarboxylic acids and polyfunctional alcohols such as those having from 2 to 12 carbon atoms. Examples of suitable polycarboxylic acids include glutaric acid, succinic acid, adipic acid, sebacic acid, phthalic acid, isophthalic acid, and teraphthalic acid. Examples of suitable polyfunctional alcohols that can be combined with any of these polycarboxylic acids include ethylene glycol, propanediol (including propylene glycol), butanediol, hexanediol and neopentyl glycol. For example, poly(neopentyl glycol adipate) can be synthesized using neopentyl glycol and adipic acid. Polyester polyols are commercially available, for example, but are not limited to, Terol® 350 or Terol® 352 (Huntsman Corp., The Woodlands, TX, USA); or STEPANPOL® PS-2352 or STEPANPOL® PS-2412 (Stepan Company, Northfield, IL, USA); or Terate® 3512 or Terate® 3512A (INVISTA, Wichita, KS, USA).

Polycarbonate polyols include those obtainable from the reaction of polyfunctional alcohols (for example, diols, including those disclosed above) with carbon acid derivatives, such as, for example, diphenyl carbonate, dimethyl carbonate, ethylene carbonate or phosgene. For example, polyhexamethylene carbonate can be synthesized by ester-exchanging polycondensation of ethylene carbonate (or dimethyl carbonate) and 1,6-hexanediol. Polycarbonate polyols are commercially available, for example, but are not limited to, DESMOPHEN® C 2100 (Covestro AG, Leverkusen, Germany).

In some embodiments, the composition can comprise one or more polymeric polyether polyols, polyester polyols, polycarbonate polyols, or a combination thereof, having an equivalent weight (g/eq) in the range of from 30 to 10000, more preferably from 30 to 5000, and most preferably from 30 to 2500.

The phosphorus-containing flame retardant provides at least 0.1 weight percent phosphorous to the polyisocyanurate foam board. In some embodiments, the polyisocyanurate foam board comprises 0.11 to 1.1 weight percent phosphorous. In some embodiments, the polyisocyanurate foam board has 0.15 to 1.0 weight percent phosphorous. In some other embodiments, the polyisocyanurate foam board has 0.2 to 1.0 weight percent phosphorous.

The phosphorus-containing flame retardant can comprise an alkyl phosphate, and in some preferred embodiments the alkyl phosphate is triethyl phosphate. Suitable flame-retardants include organo-phosphate, organo-phosphonate, organo-phosphite or an oligomeric alkyl phosphate. An exemplary organo-phosphate is triethyl phosphate.

In one embodiment, the flame-retardant is a blend of triethyl phosphate and oligomeric alkyl phosphate, wherein the ratio of triethyl phosphate to oligomeric alkyl phosphate is preferably from 90:10 to 50:50.

An exemplary alkyl phosphate is triethyl phosphate. Exemplary alkyl phosphates are Fyrol® PNX from ICL Industrial Products, Tarrytown, NY, EXOLIT® OP 550 or OP 560 from Clariant, Muttenz, Switzerland, butyl diphenyl phosphate, dibutyl phenyl phosphate and triphenyl phosphate.

The foam formulation can contain one or more non-halogenated blowing agent(s). The blowing agent can be any that are commonly used on two-component polyurethane foam systems yet is non-halogenated and contains less than five weight-percent (wt %), preferably four wt % or less, and can contain three wt % or less, two wt % or less, or even one wt % or less of water based on total blowing agent weight. Desirably, the blowing agent is any one or any combination of more than one selected from a group consisting of water, pentane isomers, or 2,2-dimethylbutane. The blowing agent is desirably present at a concentration sufficient to expand the formulation into polymeric foam having a density of 24 kilograms per cubic meter ($kg/m^3$) (1.5 $lb/ft^3$) or more and 48 $kg/m^3$ (3 $lb/ft^3$) or less as determined by ASTM D1622. Typically, this corresponds to a blowing agent concentration in a range of 0.6 to 1.2 moles of blowing agent per kilogram of formulation system weight.

The foam formulation can contain one or more non-halogenated catalyst(s) that are capable of promoting the reaction between polyol and isocyanate to form urethane linkages; these can be defined as gelation catalysts (or gelling catalysts). The gelling catalysts in low pressure spray foam formulations can be metal complexes with nucleophilic ligands or potassium carboxylate salts. The potassium carboxylate salt or some amine compounds are also used as a trimerization catalyst which promotes a condensation reaction of three isocyanate groups to generate an isocyanurate moiety. Amine-based catalysts can accelerate the reaction between water and isocyanate to produce carbon dioxide and urea and are known as blowing catalysts. For the production of polyisocyanurate rigid foams, the trimerization catalysts have been primarily used in the formulations. Examples of preferred catalysts include Evonik DABCO®TMR-2, TMR-3, TMR-4, TMR-20, TMR-30, and TMR-31.

The foam formulation can contain one or more non-halogenated surfactant(s). The surfactant helps stabilize the cells of the composition as gas evolves to form bubbles and expand the foam. Examples of suitable surfactants include alkali metal and amine salts of fatty acids such as sodium oleate, sodium stearate sodium ricinolates, diethanolamine oleate, diethanolamine stearate, diethanolamine ricinoleate, and the like: alkali metal and amine salts of sulfonic acids such as dodecylbenzenesulfonic acid and dinaphthylmethanedisulfonic acid; ricinoleic acid; siloxane-oxalkylene polymers or copolymers and other organopolysiloxanes; oxyethylated alkylphenols (such as Tergitol™ NP9 and Triton™ X100, from The Dow Chemical Company); oxyethylated fatty alcohols such as Tergitol™ 15-S-9, from The Dow Chemical Company; paraffin oils; castor oil; ricinoleic acid esters; turkey red oil; peanut oil; paraffins; fatty alcohols; dimethyl polysiloxanes and oligomeric acrylates with polyoxyalkylene and fluoroalkane side groups. These surfactants are generally used in amount of 0.01 to 6 parts by weight based on 100 parts by weight of the polyol. Generally preferred surfactant types are non-ionic, non-silicone organic surfactants such as Dabco® LK-221 or LK-443 which is commercially available from Evonik Corporation, and VORASURF™ 504 from DOW. Polyethylene oxide-butylene oxide-polyethylene oxide triblock polymer with 62.3 wt % ethylene oxide units, an equivalent weight of 3400 g/eq and nominal viscosity of 3300 centipoise at 25 degrees Celsius (° C.), for example, VORASURF™ 504 (VORASURF™ is a trademark of The Dow Chemical Company).

The foam formulation can further contain one or more non-halogenated additive(s). For example, the thermoset foam can contain other components including one or more additional additive(s) selected from interfacial agents, preservatives, antioxidants, catalyst, colorants, bitterants, fillers, infrared attenuators (such as carbon black, graphite and titanium dioxide) and residual blowing or frothing agent; as long as none of these other components contain a halogen.

In some embodiments, the polyisocyanurate foam board comprises 0.55 to 5.5 weight percent triethyl phosphate, while in some embodiments the polyisocyanurate foam board comprises 0.5 to 5.0 weight percent triethyl phosphate. In still other embodiments, the polyisocyanurate foam board comprises 0.75 to 5.0 weight percent triethyl phosphate, or 1.0 to 5.0 weight percent triethyl phosphate.

The use of the specific NCO Index range in the non-halogen foam formulation results in a cured polyisocyanurate foam board having a trimer content of 11 to 19.5 weight percent. In some embodiments, the polyisocyanurate foam board has a trimer content of 12 to 18 weight percent, preferably 14 to 17 weight percent.

The polyisocyanurate foam board additionally has 1.06 to 1.66 $kg/m^3$ (30 to 47 $g/ft^3$) of glass fiber distributed in the foam throughout the thickness of the board. In some embodiments. In some embodiments, the polyisocyanurate foam board has 1.24 to 1.59 $kg/m^3$ (35 to 45 $g/ft^3$) of glass fiber distributed in the foam throughout the thickness of the board. In some other embodiments, the polyisocyanurate foam board has 1.41 to 1.66 $kg/m^3$ (40 to 47 $g/ft^3$) of glass fiber distributed in the foam throughout the thickness of the board, or 1.41 to 1.59 $kg/m^3$ (40 to 45 $g/ft^3$) of glass fiber distributed in the foam throughout the thickness of the board. In some embodiments, the glass fiber is primarily randomly distributed throughout the thickness of the board.

The glass is supplied to the non-halogenated polyisocyanurate foam board in the form of one or more nonwoven webs or mats, the terms "web" and "mat" used interchangeably herein. The web or mat is generally incompressible and, in some embodiments, preferably comprises glass fibers that are generally straight and not crimped, crinkled, or the like. Preferably, the glass fibers in the web/mat are considerably longer than in typical textile applications, having lengths measured in feet rather than inches, as described in U.S. Pat. No. 4,028,158 to Hipchen et al. In some embodiments the glass fibers have a length greater than one foot; in some embodiments the glass fibers have an average length of 5 feet. In some embodiments, the glass fibers have an average diameter of less than 25 microns.

Intermingled with the glass fibers is a relatively minor proportion of a binder, present only in an amount that creates a glass fiber web or mat that is dimensionally stable such that it can be handled and rolled on a core and then unwound; but still allows the web or mat to be expanded by the expansion of a foam-forming mixture that has been embedded in the interstices between the fibers in the mat. In some embodiments, the binder is preferably a silane modified polyester binder amounting to about 2 to 10 percent by weight of the combined glass fiber and binder.

A single web/mat of glass fiber can be used in the making of the non-halogenated polyisocyanurate foam board, or multiple layers of webs/mats can be combined in the making of the board, with all of them expanded by the expansion of the flowable foam formulation. In some embodiments, while webs/mats are used in the making of the non-halogenated polyisocyanurate foam board, the sheet structure of the webs/mats is no longer present in the final non-halogenated polyisocyanurate foam board, the expanding foam having substantially separated the fibers and destroyed the original web/mat sheet structure. The combination of the number of web/mats used and their relative basis weights is selected as desired to achieve the 1.06 to 1.66 $kg/m^3$ (30 to 47 $g/ft^3$) of glass in the foam board.

Surprisingly, it has been found that the faced, non-halogenated polyisocyanurate foam board need adequate amounts of glass fiber to pass the Class A fire rating tests, and it is believed this is the case regardless of the amount of phosphorous flame retardant added to the foam formulation.

The polyisocyanurate foam board further comprises a facer layer on both sides of the board, the facer layer(s) forming the outer surface(s) of the board. The facer, also known as a facesheet, can be bonded to at least one exterior surface of the foam in the foam board. Preferably, there is at least one facesheet bonded to at least one exterior major face of the foam; most preferably both major faces of the foam have a covering of at least one facesheet bonded thereto, leaving only the minor faces (i.e., the edges) of the foam board without a facesheet covering.

The facesheet material can be a polymeric sheet or plate, a sheet of resin impregnated fibrous yarns (prepreg), wood, or metal. A preferred metal is aluminum. The facesheets are preferably attached to the foam during the pressing of the flowable foam formulation into the web of glass fiber to form a board precursor, typically in the gap between two calender rolls, or in some sort of press including a belt press. However, if desired, one or more of the facesheet(s) can be added after the board is made by use of an adhesive or adhesive film.

This invention also relates to a process for making a polyisocyanurate foam board comprising the steps of:
 a) making a flowable halogen-free foam formulation comprising isocyanate and polyol, and phosphorus-containing flame retardant, wherein the NCO Index is 225 to 480, and wherein the phosphorus-containing flame retardant is present in an amount such that the halogen-free foam formulation has at least 0.11 weight percent phosphorus;
 b) contacting the flowable halogen-free foam formulation with 1.06 to 1.66 kg/m³ (30 to 47 g/ft³) of an expandable web of glass fiber;
 c) pressing the flowable foam formulation into the web of glass fiber to form a board precursor,
 d) allowing the flowable foam formulation in the board precursor to expand into a foam in the presence of the web of glass fibers, wherein foam formulation separates and distributes the glass fibers in the web throughout the foam, and further cure to form the polyisocyanurate foam board, wherein the polyisocyanurate foam board has, as measured by ASTM E84, a Flame Spread Index of 0 to 25 and a maximum Smoke Development Index of 450 or less.

One method of making the halogen-free polyisocyanurate foam board is by use of equipment such as shown in FIG. 1 of U.S. Pat. No. 4,028,158 to Hipchen et al. and the processing described therein. Specifically, the equipment can include tanks for containing the ingredients for the flowable halogen-free foam formulation, along with suitable pumps and piping to provide the ingredients to a mixing device that combines the ingredients and forms the flowable halogen-free foam formulation.

One or more webs of glass fiber, and facers, are all preferably provided in sheet form from rolls on unwinds.

The flowable halogen-free foam formulation from the mixing device and the web of glass fiber, and optional facers, can all meet at or prior to the entrance of equipment that spreads the flowable halogen-free foam formulation and forces the foam formulation into interstices of the glass web and between the individual glass fibers. Such equipment can be a pair of calender rolls set at a desired gap for pressing the combined flowable halogen-free foam formulation and the web of glass fiber together (and optional facers) to form a board precursor of desired thickness. If optional facers are used, they are generally placed between the combined foam formulation/glass fiber web(s) and the calender roll surfaces, such that the precursor board has a facer on both the top and bottom surfaces.

The precursor roll can continue through an oven circulating hot air to first expand and then cure the combined flowable halogen-free foam formulation and the web of glass fiber into a halogen-free polyisocyanurate foam board, which can be cut into individual boards of desired size.

In step a) of the process, the flowable halogen-free foam formulation comprises isocyanate and polyol, wherein the NCO Index is 225 to 480. In some embodiments, the NCO Index is 275 to 440, and in other embodiments, the NCO Index is 300 to 400.

In step a) of the process, the flowable halogen-free foam formulation comprises at least 0.11 weight percent phosphorous. In some embodiments, the flowable halogen-free foam formulation comprises 0.15 to 1.0 weight percent phosphorous. In some other embodiments, the formulation comprises 0.2 to 1.0 weight percent phosphorous.

The phosphorus-containing flame retardant can comprise an alkyl phosphate, and in some preferred embodiments the alkyl phosphate is triethyl phosphate. In some embodiments, the flowable halogen-free foam formulation comprises 0.5 to 5.5 weight percent triethyl phosphate, while in some embodiments the flowable halogen-free foam formulation comprises 0.75 to 5.0 weight percent triethyl phosphate. In still other embodiments, the formulation comprises 1.0 to 5.0 weight percent triethyl phosphate.

In some embodiments, the step c) of pressing the flowable foam formulation into the web of glass fiber to form a board precursor is conducted between a set of calender rolls. Generally, these are not nipped but set apart at a desired gap for pressing the combined flowable halogen-free foam formulation and the web of glass fiber together (and optional facers) to form a board precursor of desired thickness.

Additionally, if desired, the flowable halogen-free foam formulation contacts with one or two facer(s) prior to step (c). This means one or more of the facer layers may wrap one surface of a calender roll prior to the calender roll set gap point. In a preferred embodiment, the bottom facer layer is provided from a roll and the web of glass fiber, which is also provided from a roll, is place on top of the facer layer prior to the set gap point. The flowable foam formulation is provided on top of the web of glass fiber, generally by supplying the formulation near the center or distributed across the web, the top face layer is then supplied on top of the flowable foam formulation. The set gap point essentially distributes the flowable foam formulation across the face of the glass fiber web, uniformizing the amount, while also pressing the formulation into the web into the gaps and interstices between the fibers of the web of glass fibers. The result is a board precursor structure of the foam formulation that has a relatively uniform thickness across the width.

In some embodiments, the step d) of expanding the board precursor into a foam in the presence of the web of glass fibers is conducted in an oven maintained at an elevated temperature. The elevated temperature assists the reaction of the foam formulation and its expansion into a foam; and the foam expansion in turn disrupts the web of glass fiber and distributes it across the thickness of the expanded foam.

Test Methods

The following test methods can be used; additional test method information is provided in Table 2:
 ASTM E84-19b Standard Test Method for Surface Burning Characteristics of Building Materials.
 UL723-11 Standard Test Method for Surface Burning Characteristics of Building Materials.
 NFPA 286 (2019) Standard Methods of Fire Tests for Evaluating Contribution of Wall and Ceiling Interior Finish to Room Fire Growth.
 Method for Direct Measurement of Isocyanurate (Trimer) Content in Foams. The amount of isocyanurate (trimer) can be determined using an IR spectrometer, using an appropriate model isocyanurate compound to make a calibration curve.

Preparation of sample for making a calibration curve: Formulations for making calibration curve were prepared without any trimer catalyst such as carboxylate salts to minimize isocyanurate amount caused by reaction heat. The model isocyanurate compound (1,3,5-triphenylisocyanurate (TPI), CAS Number: 1785-02-0) for making a calibration curve does not contain reactive and alkyl groups. Therefore, addition of TPI in varying amounts does not affect the desired IR peak area ratio between the isocyanurate peak of the model compound and the alkyl peak of the formulation after preparation of samples. A polyol blend, isocyanate and model compound (TPI) were mixed in a 100 mL plastic beaker and poured onto a plastic film (more detailed formulation information is shown in Table 1). After fully curing for 1 day, the samples were fully crushed to make powder.

TABLE 1

| Material | 0% TPI | 4% TPI | 8% TPI | 12% TPI | 16% TPI |
|---|---|---|---|---|---|
| Polyester polyol (Terol ® 563) | 0.66 g | 0.66 g | 0.66 g | 0.66 g | 0.66 g |
| Polyether polyol (VORANOL ™ 470X) | 0.02 g | 0.02 g | 0.02 g | 0.02 g | 0.02 g |
| Surfactant (VORASURF ™ 504) | 0.02 g | 0.02 g | 0.02 g | 0.02 g | 0.02 g |
| Water | 0.01 g | 0.01 g | 0.01 g | 0.01 g | 0.01 g |
| Flame retardant (TEP) | 0.10 g | 0.10 g | 0.10 g | 0.10 g | 0.10 g |
| Hydrocarbon Blend described in Table 2 | 0.19 g | 0.19 g | 0.19 g | 0.19 g | 0.19 g |
| Polymeric methylene diphenyl diisocyanate (PMDI, PAPI ™ 20) | 1.73 g | 1.73 g | 1.73 g | 1.73 g | 1.73 g |
| TPI (model compound) | 0.00 g | 0.29 g | 0.58 g | 0.87 g | 1.16 g |
| Total | 2.73 g | 3.02 g | 3.31 g | 3.60 g | 3.89 g |

Figure 2:
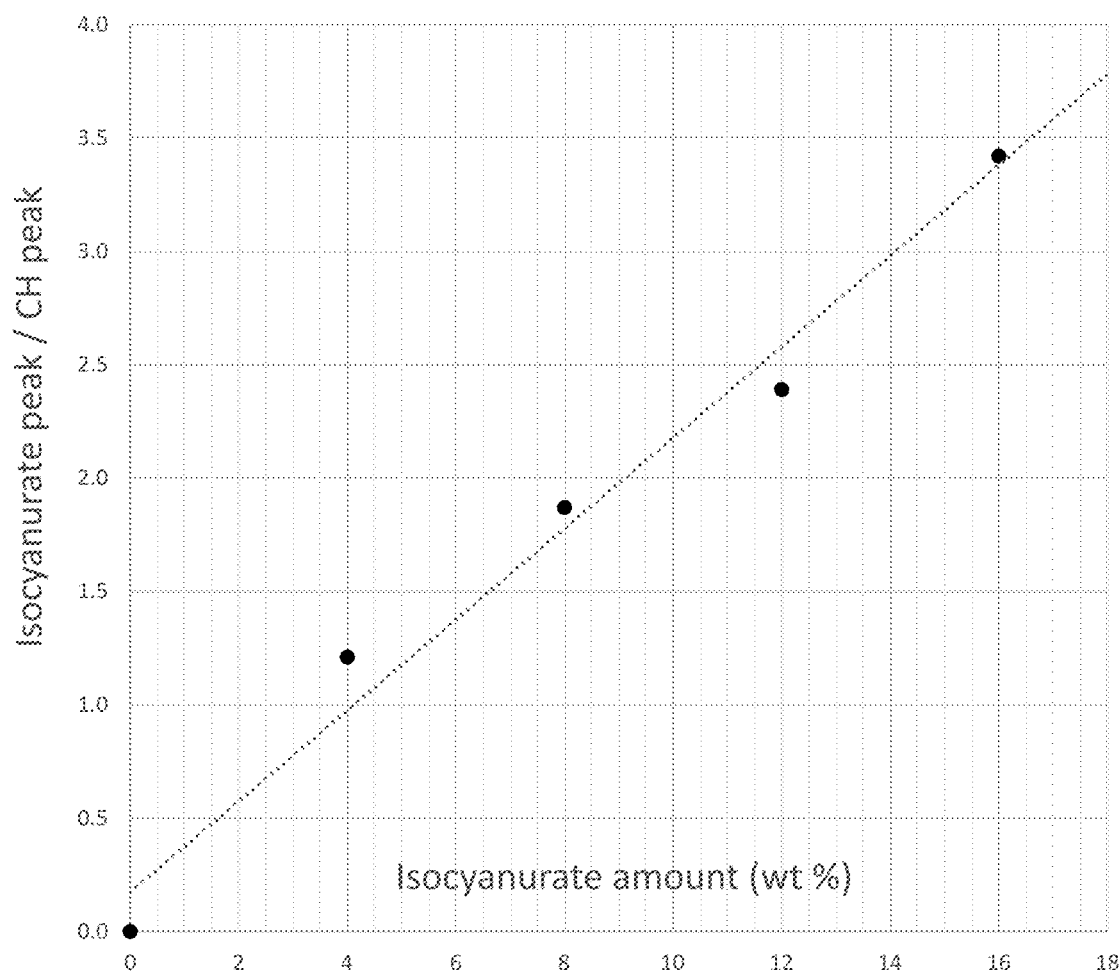
FIG. 2 is and exemplary calibration curve for determining isocyanurate (trimer) content of the foam using IR analysis as described in the test methods.

ATR-FTIR analysis: Foam samples were thoroughly ground into small pieces (less than 2 mm thick) or powder. Infrared spectra were acquired with a PerkinElmer Spectrum Two FT-IR and Universal ATR Sampling Accessory from 600 to 4000 cm-1 at a resolution of 4 cm-1. Sixteen scans were collected for each spectrum. The Universal ATR Sampling Accessory was equipped with a single bounce diamond/ZnSe crystal. A calibration curve (FIG. 2) was constructed that correlated the (NCO/CH) peak ratio to the weight percent isocyanurate (trimer), in accordance with the published method of Nabulsi, A. A.; Cozzula, D.; Leitner T. H.; Muller, T. E., *Polym. Chem.*, 2018, 9, 4891.

To determine the amount of trimer in a foam, a sample of the foam is ground into small pieces as described before and the IR peak ratio ($NCO_{isocyanurate}/CH_{alkyl}$ group) measured. The actual trimer amount of the sample can be determined by comparison with the calibration curve of the correlation between trimer amount and IR peak ratio ($NCO_{isocyanurate}/CH_{alkyl}$ group) made with the same formulation but containing the model compound.

TABLE 2

| Property or Characteristic | Determination | Reference |
|---|---|---|
| PMDI functionality | Standard Test Method | ASTM D2752-06e |
| Free glycol | Proton NMR | Kadkin, O, J. Polym. Sci. A, 41, 1120 (2003) http://www.vanderbilt.edu/AnS/Chemistry/omrg/Articles/JPSa_2003_1114.pdf |
| Polyol Equivalent Weight | Calculated based on MW and number of reactive sites | Szycher, M, Szycher's Handbook of Polyurethanes, 2nd Edition, CRC Press, New York, Appendix D.2, pg 1088 (2013). |
| % NCO | Standard Test Method | ASTM D2572-06e |
| NCO Index | 100 × (NCO equivalents/OH equivalents) | Szycher, M, Szycher's Handbook of Polyurethanes, 2nd Edition, CRC Press, 7.4.1, New York, pg 199 (2013). |
| Formulation Trimer content | Calculation defined in the reference | Ashida, K, Editor, Polyurethane and Related Foams: Chemistry and Technology, CRC Press, New York, Chapter 5, Polyisocyanurate Foams pp 106-107 (2006) |
| Thermal Insulation (R/inch), initial | Standard Test Method | ASTM C518-17 |
| Density (lb/cubic ft) | Standard Test Method | ASTM D1622-14 |
| Vertical Compressive Strength (psi) | Standard Test Method | ASTM D 1621-16 |
| Vertical Compressive Modulus (psi) | Standard Test Method | ASTM D 1621-10 |
| Flexural Strength (peak stress, psi) | Standard Test Method | ASTM C 203-05a (2017) Method 1 Procedure B |
| Tensile Strength (peak stress, psi) | Standard Test Method | ASTM C 209-15 |
| Thermal and Humid Aging (vol % change) | Standard Test Method | ASTM D 2126-15 −40° C./ambient RH, 70° C./97% RH, 93.3° C./ambient RH |
| Water Absorption (wt. %) | Standard Test Method | ASTM C 209-15 section 14 2-hour submersion time |
| Phosphorous Content in the Foam | Plasma-Atomic Emission Spectrometry (ICP-AES) | "Determination of Phosphorus in Flame Retardant Samples by ICP-AES" California Environmental Protection Agency Department of Toxic Substances Control-Environmental Chemistry Laboratory DCN: 03.6010.01 Revision No: 3, Mar. 3, 2020 |

EXAMPLES

Information on the materials used in the examples is provided in Table 3:

TABLE 3

| Reference | Supplier | Brief Description |
|---|---|---|
| T563 | Terol ® 563 from Huntsman, The Woodlands, TX | Aromatic polyester polyol |
| PAPI ™ 20 | Dow Chemical Company, Midland, MI | Polymeric methylene diphenyldiisocyanate (PMDI) |
| V504 | VORASURF ™ V504 from Dow Chemical Company, Midland, MI | Polyethylene oxide-butylene oxide-polyethylene oxide triblock polymer surfactant |
| TMR 20 | Dabco ® TMR20 from Evonik Industries, Parsippany, NJ | A potassium carboxylate salt catalyst |
| 470X | VORANOL ™ 470X from Dow Chemical Company, Midland, MI | A Mannich polyether 30 30 polyol |
| TEP | | Triethylphosphate flame retardant |

TABLE 3-continued

| Reference | Supplier | Brief Description |
|---|---|---|
| Blowing Agent: Hydrocarbon Blend | Trecora ® South Hampton Resources | Blowing agent comprising: 60 wt. % c-C5 (CAS nr. 287-92-3) 20 wt. % i-C5 (CAS nr. 78-78-4) 20 wt. % 2,2 dimethylbutane (CAS nr. 75-83-2) |
| Blowing Agent: Water | | Deionized water |

Examples 1 to 4 and Comparative Example A

Foam boards (48 in wide×3 inch thick) were produced using equipment similar to that as shown and described in in FIG. 1 of U.S. Pat. No. 4,028,158 to Hipchen et al. and cut into samples. The amounts of the chemical constituents used for the inventive and comparative formulations are shown in Table 4.

The chemical constituents were formulated into two components, component A (A side) which is the MDI-containing component, and a Component B (B side) which is the polyol-containing component. The B side also contains the additional chemical additives (surfactant (VORASURF™ V504), catalyst (TMR 20), water, and phosphorus fire retardant (TEP)).

The hydrocarbon blowing agent used was obtained from Trecora® South Hampton Resources. It is a blend of cyclopentane, iso-pentane, and 2,3 dimethylbutane in a mass ratio of 60/20/20. The hydrocarbon blowing agent was added to the A-side and B-side in the respective mass ratios of 1.24/1.0 (A-side/B-side).

Expandable glass matts, obtained from Schmelzer Industries, were used in the manufacture of the reinforced foam. Different weights and plies of mat were used to regulate the glass content in the foam, as described in Table 4.

The mats were unrolled and inserted into the chemical bank which is produced as the chemical constituents were mixed to form a flowable foam formulation, that was dispensed onto a bottom aluminum facer (0.0009 inch-thick and obtained from Hanover Foils, LLC), that had been routed to a pour table. The flowable foam formulation was subsequently spread laterally by running the combination of flowable foam formulation, glass mat(s), and bottom facer through two spaced-apart calibrating rolls. An identical aluminum facer (0.0009 inch-thick) is applied to the opposite side of the flowable foam formulation prior to the gap between the two spaced-apart calibrating rolls. The rolls then force the flowable foam formulation to penetrate and imbed between the individual fibers of the expanded glass mats(s) and form a board precursor exiting the rolls.

The board precursor traverses through a 30-meter-long forced air convection oven maintained at a temperature of 124° C., where the foamable formulation was allowed to react and foam to produce the cured foam board. The foaming process causes the glass in the mat to separate and to disperse across the foam cross-section, creating a structure that is termed a core foam. At the exit of the oven, the foam has at least partially cured, and after exiting the oven, the foam was cut to length, stacked on a pallet, and moved to a storage area where the foam attains its final state of cure.

Foam proprieties and fire test results are summarized in Table 4. Physical and mechanical properties were determined in accordance with ASTM C1289-22a. Fire tests were performed in accordance with ASTM E84-22a (Standard Test Method for Surface Burning Characteristics of Building Materials) and NFPA 286 (Standard Methods of Fire Tests for Evaluating Contribution of Wall and Ceiling Interior Finish to Room Fire Growth) in the wall only configuration.

As shown, Example 2 had a glass content of less than 30 g/ft$^3$ and did not pass the Class A fire test per ASTM E84, while the other examples that had a glass content of more than 30 g/ft$^3$ did pass the Class A requirement, meaning that they had a Flame Spread Index of 0 to 25 and a maximum Smoke Development Index of 450 or less.

TABLE 4

| Component | Descriptor | Ex. 1 wt % | Ex. A wt % | Ex. 2 wt % | Ex. 3 wt % | Ex. 4 wt % |
|---|---|---|---|---|---|---|
| MDI | Papi ™ 20 | 63.3% | 63.3% | 59.5% | 67.4% | 68.0% |
| Polyester Polyol | Terol ® 563 | 24.3% | 24.3% | 30.7% | 19.9% | 21.0% |
| Polyether Polyol | V470X | 0.5% | 0.5% | 0.8% | 0.7% | 0.7% |
| Surfactant | V504 | 0.7% | 0.7% | 0.7% | 0.7% | 0.7% |
| Catalyst | TMR-20 | 0.6% | 0.6% | 0.9% | 0.8% | 0.8% |
| Blowing Agent | Water | 0.2% | 0.2% | 0.2% | 0.3% | 0.3% |
| Blowing Agent | Hydrocarbon Blend | 6.7% | 6.7% | 6.3% | 6.3% | 6.5% |
| Phosphorus FR | TEP-Triethylphosphate | 3.5% | 3.5% | 0.7% | 4.0% | 2.0% |
| | Total wt % | 100.0% | 100.0% | 100.0% | 100.0% | 100.0% |
| Glass Mat A | 5.6 g/ft$^2$ | 2 plies | — | 2 plies | 2 plies | 2 plies |
| Glass Mat B | 4.0 g/ft$^2$ | — | 1 ply | — | — | — |
| Glass Mat C | 2.0 g/ft$^2$ | — | 1 ply | — | — | — |
| Glass Content | g/ft$^3$ | 44.4 | 24.0 | 44.4 | 44.4 | 44.4 |
| Foam Characteristics | wt % Trimer | 15.1 | 15.1 | 11.8 | 17.2 | 16.9 |
| | NCO Index | 319 | 319 | 243 | 370 | 362 |
| | wt % Phosphorus | 0.60% | 0.60% | 0.13% | 0.68% | 0.34% |
| | Percent Bromine | Zero | Zero | Zero | Zero | Zero |
| | Percent Halogen | Zero | Zero | Zero | Zero | Zero |

TABLE 4-continued

| Component | Descriptor | Ex. 1 wt % | Ex. A wt % | Ex. 2 wt % | Ex. 3 wt % | Ex. 4 wt % |
|---|---|---|---|---|---|---|
| Foam Properties | Density (pcf) | 1.75 | 1.72 | 1.73 | 1.83 | 1.79 |
| | R/in | 6.3 | 6.5 | 6.6 | 6.3 | 6.5 |
| | R/in, 70 days | 6.0 | 6.2 | 6.3 | 6.1 | 6.3 |
| | Vertical Compressive Strength | 32.6 | 33.1 | 34.9 | 36.1 | 40.0 |
| | Vertical Compressive Modulus | 1230 | 1010 | 670 | 1560 | 1040 |
| | Dimensional Stability, −40° C. | (0.1) | 0.5 | (0.9) | (0.3) | (0.7) |
| | Dimensional Stability, 70° C., 97% RH | 1.4 | 1.7 | 0.3 | 1.5 | 1.5 |
| | Dimensional Stability, 93.3° C. | (0.4) | (0.3) | (1.1) | (0.6) | (0.6) |
| | Water Absorption | 0.03 | 0.05 | 0.02 | 0.03 | 0.02 |
| Fire Test Results | ASTM E84 Faced | Class A | Class B | Class A | Class A | Class A |
| | E84 Flame Spread Index | 13.0 | 37.2 | 23.2 | 24.9 | 15.8 |
| | E84 Smoke Dev. Index | 158 | 163 | 383 | 167 | 120 |
| | NFPA 286, Walls | Pass | Pass | Pass | Pass | Pass |

The invention claimed is:

1. A polyisocyanurate foam board having a length, width, and thickness, and having a facesheet on both major outer surfaces, the foam board comprising:
   a) a halogen-free foam made from a halogen-free foam formulation comprising isocyanate, polyol, and phosphorus-containing flame retardant; and
   b) 1.24 to 1.59 kg/m³ (35 to 45 g/ft³) of glass fiber distributed in the foam throughout the thickness of the board;
wherein the polyisocyanurate foam board has a trimer content of 11 to 19.5 weight percent based on the said halogen-free foam, at least 0.1 weight percent phosphorous based on the said halogen-free foam, and wherein said board has, as measured by ASTM E84, a Flame Spread Index of 0 to 25 and a maximum Smoke Development Index of 450 or less.

2. The polyisocyanurate foam board of claim 1, wherein the halogen-free foam of the polyisocyanurate foam board comprises 0.11 to 1.1 weight percent phosphorous.

3. The polyisocyanurate foam board of claim 1 wherein the phosphorus-containing flame retardant comprises an alkyl phosphate.

4. The polyisocyanurate foam board of claim 3 wherein the alkyl phosphate is triethyl phosphate.

5. The polyisocyanurate foam board of claim 3 wherein the halogen-free foam of the polyisocyanurate foam board comprises 0.5 to 5.0 weight percent triethyl phosphate.

6. The polyisocyanurate foam board of claim 1 wherein the halogen-free foam formulation has an NCO Index of 225 to 480.

7. The polyisocyanurate foam board of claim 6 wherein the halogen-free foam formulation has an NCO Index of 275 to 440.

8. The polyisocyanurate foam board of claim 1 having aluminum facesheets.

9. A process for making a polyisocyanurate foam board comprising the steps of:
   a) making a flowable halogen-free foam formulation comprising isocyanate and polyol, and phosphorus-containing flame retardant,
   wherein the NCO Index is 225 to 480, and the flowable halogen-free foam formulation has at least 0.11 weight percent phosphorus;
   b) contacting the flowable halogen-free foam formulation with 1.24 to 1.59 kg/m³ (35 to 45 g/ft³) of an expandable web of glass fiber;
   c) pressing the flowable foam formulation into the web of glass fiber to form a board precursor,
   d) allowing the flowable foam formulation in the board precursor to expand into a foam in the presence of the web of glass fibers, wherein foam formulation separates and distributes the glass fibers in the web throughout the foam, and further cure to form the polyisocyanurate foam board,
wherein the polyisocyanurate foam board has, as measured by ASTM E84, a Flame Spread Index of 0 to 25 and a maximum Smoke Development Index of 450 or less.

10. The process of claim 9 wherein the flowable halogen-free foam formulation has an NCO Index of 300 to 400.

11. The process of claim 9 wherein the flowable halogen-free foam formulation comprises 0.2 to 1.0 weight percent phosphorous.

12. The process of claim 9 wherein phosphorus-containing flame retardant comprises an alkyl phosphate.

13. The process of claim 12 wherein the alkyl phosphate is triethyl phosphate.

14. The process of claim 11 wherein the flowable halogen-free foam formulation comprises 0.5 to 5.5 weight percent triethyl phosphate.

15. The process of claim 9 wherein the pressing of step c) is conducted between a set of calender rolls.

16. The process of claim 9 wherein step d) is conducted in an oven maintained at a temperature that assists the reaction of the flowable halogen-free foam formulation and its expansion into a foam.

17. The process of claim 9 wherein the flowable halogen-free foam formulation contacts one or two facesheet(s) prior to or during step (c).

\* \* \* \* \*